3,223,163
COMPOSITION AND METHOD FOR STABILIZATION OF SOIL

Ronney R. Koch, Joseph Ramos, and Homer C. McLaughlin, Duncan, Okla., assignors to Halliburton Company, Duncan, Okla., a corporation of Delaware
No Drawing. Filed Apr. 16, 1962, Ser. No. 187,951
21 Claims. (Cl. 166—33)

The present invention relates to a new and improved composition and method of stabilizing soil, consolidating loose sands, grouting, and bridging or plugging openings of vugular and/or fractured formations.

The present invention particularly relates to a new and improved consolidating slurry comprising a solution of a relatively thin, low viscosity, water soluble pre-polymer gelling material and a quantity of finely divided relatively inert solids dispersed and/or suspended therein.

An important object of the present invention is to provide a new and improved soil stabilization and/or grouting slurry which is not only relatively thin or of low viscosity so as to adequately penetrate a formation, but which also has the unique ability of mechanically plugging a vugular and/or fractured formation.

Another important object of the present invention is to provide a new and improved grouting solution for use in shutting off water in air, gas and aerated mud drilled wells, and for controlling water, gas and other fluids in producing and water injection wells.

Still another object of the present invention is to effectively seal cracks, fissures, vugs, porous earth formations and the like which cause lost circulation during the drilling of wells.

A further object of the present invention is to provide a new and improved method of stabilizing soils, wherein substantially uniform penetration of the stabilizing material into the earth formation openings is obtained.

Still a further object of the present invention is to seal porous formations in the earth against the passage of fluids.

Still another object of the present invention is to provide a new and improved method of stabilizing soils and/or grouting, utilizing a slurry of a water soluble pre-polymer gelling material selected from the group of sodium silicate gels, ethenoid monomers containing acrylyl groups, chrome lignin gels, and the like and a quantity of finely divided relatively inert or non-reactive solids from the group of gilsonite, asphaltic pyrobitumens, silica flour, barites, bauxite, talc, scoria, calcium carbonate and the like.

Yet another object of the present invention is to provide a new and improved method of soil stabilization or grouting, utilizing a water soluble pre-polymer and finely divided inert solids, wherein the solids are of a particle size between about 10 and about 180 microns and present in an amount between about .25 and 1.25 gallons per gallon of grouting solution based on absolute gallons.

Other objects and advantages of the present invention will be readily apparent to those skilled in the art upon consideration of the detailed disclosure hereinbelow.

The present invention is an improved method over the soil stabilization methods of U.S. Patents No. 2,940,729, 2,801,984, 2,801,985 and copending application Serial No. 24,227 filed April 25, 1960, now Patent No. 3,136,360.

The grouting slurry of copending application, Serial No. 24,227, is adapted for use in tight low permeable formations having no fractures, or fractures of such a small size, that the solution does not readily penetrate the formation. Such grouting slurry also contains a quantity of finely divided solid particles which have rough and/or irregular surfaces and in such an amount, preferably from about .10% to about 5.0% of solids by weight of gel forming solution, that a permeable filter cake is formed on the formation face which screens out any prematurely gelled particles or foreign matter which may be picked up from the mixing equipment, the chemicals themselves or from the water available, and thereby enables the gelling solution itself to penetrate the formation so that an effective and uniform consolidation is achieved.

The grouting slurry of the present invention utilizes the same water soluble gelling materials, but includes a quantity of finely divided solids in much larger amounts, from about .25 to about 1.25 absolute gallons per gallon of grouting solution, and the surfaces of the solid particles may be smooth, round or otherwise, as well as rough or irregular.

The present invention has a number of advantages over the prior art methods among which are: A viscosity is effected whereby resistance to a rapid loss in fractures, fissures, pores, etc., is overcome thereby permitting greater pressure to be applied to the grout during placement thereof. The finely divided solids tend to screen out on the surface of the exposed formation at the zone or area of highest permeability, despositing a low permeable sheath. This occurs at such zones of high permeability as these zones more readily accept fluid than the tighter or less permeable areas. When the sheath or cake formed is of equal or lower permeability than the rest of the exposed formation face, the fluid portion of the grouting solution is forced into another part of the formation, where a low permeable sheath of the finely divided solids is again desposited. Such partially selective procedure continues until all of the exposed formation surface has been penetrated by the grouting fluid or solution.

Additionally, the particles of finely divided solids are such that they do not interfere by plugging natural pores sufficiently to give excessively low fluid loss properties, but tend to actually control the fluid loss for a better coverage of the zone or area being treated.

The finely divided solids of the present invention also provide a means of controlling the density of the slurry and also the gelled material or polymerized composition. This is important in that the density of the material can be varied to meet particular operating conditions without losing the effect or the intent of the present invention.

If the grouting solution does not contain the finely divided solids, and is lost into a fracture or fissure, and after a gel occurs, such gel has little strength and can be extruded from or further into the fracture. The incorporation of the finely divided solids in the grouting solution adds considerably more strength to the gel, and the possibility of extrusion of the gel is lessened.

It should also be noted, that clays such as bentonite, medium to coarse sand, and cement have been used in prior art slurrys. These materials are disadvantageous, in that clays do not have the ability to allow sufficient loss of fluid to the surrounding formations or have a deleterious plastering effect, sand does not stay suspended in the solution and cement gives a high pH, about 12, and accelerates or retards the set.

In carrying out the present invention, the grouting or stabilizing slurry is prepared by mixing a quantity of finely divided inert solids of a particle size of about 10 to about 180 microns with a pre-polymer solution of a water soluble gelling material and in an amount of from about .25 to about 1.25 absolute gallons per gallon of solution, whereby the solids are suspended in the solution.

Some examples of the finely divided inert solids which may be used in the present invention, are: gilsonite, asphaltic pyrobitumens, silica flour, barite, tac, bauxite and scoria. Calcium carbonate may also be used with gels or gel forming compositions with which it is non-reactive.

Some examples of water soluble gels or gel-forming compositions which may be employed in the present invention are the sodium silicate gels, a polymerizable mixture of an ethenoid monomer containing an acrylyl group, and a chrome lignin gel. These gelling compositions or materials may be prepared as disclosed in copending application Serial No. 24,227, the patents set forth hereinabove, or other methods known to those skilled in the art. This invention is, of course, not limited to any particular way of preparing the gelling material. It is understood, also, that the gelling material contains a suitable catalyst or has a catalyst applied thereto, so that the desired gelling of the material can take place. The use of catalysts for setting these gels are well known in the art, and this invention is not limited to any particular catalyst or method of setting the gelling material.

It should be further noted, that in carrying out a grouting or soil stabilizing operation, that the placement of the grouting solution should be completed before the filter cake or sheath becomes substantially impermeable.

An ethenoid monomer of the following structure is particularly illustrative of an acrylic pre-polymer used in the present invention:

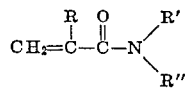

where R is either H or $CH_3$, R' is either H or an alkyl group and R'' is either H or an alkyl group. Numerous specific examples of these compounds are disclosed in the aforesaid patents, among which are included a mixture of 95%–99% acrylamide and 1%–5% N,N' methylene bisacrylamide. A suitable catalyst such as ammonium persulfate or others is also included with this type of gelling material.

In using an organic solid particle such as finely divided gilsonite or an asphaltic pyrobitumen or the like, a suitable surfactant must also be added to the grouting or stabilizing slurry to suspend the solids therein. Any surfactant which lowers the surface tension of the grouting solution, is effective for this purpose. Sodium tetradecyl sulfate and a trimethyl nonyl ether of polyethylene glycol have been found to be particularly effective with these organic materials. It has also been discovered that the surfactant may be nonionic, anionic or cationic.

Some laboratory test results are as follows:

PROCEDURE

A slurry was prepared using the polymerizable acrylamide mixture for the water soluble gelling material and gilsonite as the finely divided inert solids. A trimethyl nonyl ether of polyethylene glycol was used as the necessary surfactant to keep the gilsonite particles suspended in the slurry or grouting and consolidating solution.

In test series I, Berea cores were fractured and propped open with walnut shells and aluminum pellets. The cores were then placed into a Hassler Sleeve apparatus, and flow rates were determined before and after squeezing with the slurry.

In test series II, a lucite tube was packed with gravel, and the slurry was squeezed into the void spaces.

In test series III, a glass tube was packed with 4–8, 8–12, 20–40 Oklahoma Creek and Oklahoma No. 1 sands. The slurry was then squeezed into the tube.

DATA

A good slurry was obtained using the following materials:

*Water soluble gelling material.*—100 cc. of a 10% solution of a polymerizable mixture comprising about 95% acrylamide and 5% N,N'-methylenebisacrylamide.

*Finely divided solids.*—115 grams of gilsonite of a minus 80 mesh (U.S. Sieve Series), or 177 microns.

*Surfactant.*—0.15 cc. of a trimethyl nonyl ether of polyethylene glycol (Tergitol TMN).

*Catalyst.*—.5% by weight of solution of ammonium persulfate; .4% by weight of solution of dimethyl amino propionitrile.

(I)

DELIVERY RATES BEFORE TREATMENT

| Core No. | Delivery rate,[1] cc./min. | Annulus Pressure (p.s.i.) | Pressure on Core (p.s.i.) |
| --- | --- | --- | --- |
| 1 | 65.3 | 525 | 0 |
| 2 | 80.7 | 500 | 0 |
| 3 | 88.6 | 100 | 0 |

[1] Average of 3 runs.

DELIVERY RATES AFTER TREATMENT

| Core No. | Delivery Rate,[1] cc./min. | Annulus Pressure (p.s.i.) | Pressure on Core (p.s.i.) | Percent Reduction in Rate |
| --- | --- | --- | --- | --- |
| 1 | 20.7 | 250 | 20 | 68.5 |
| 1 | 20.5 | 200 | 60 | 68.1 |
| 2 | 1.5 | 500 | 40 | 98.2 |
| 2 | 9.3 | 500 | 80 | 88.4 |
| 2 | 24.7 | 500 | 120 | 69.4 |
| 3 | 1.0 | 100 | 40 | 98.9 |
| 3 | 2.3 | 100 | 80 | 97.4 |
| 3 | 3.8 | 250 | 120 | 95.7 |
| 3 | 5.0 | 250 | 160 | 94.4 |
| 3 | 5.3 | 250 | 200 | 94.0 |
| 3 | 5.3 | 400 | 240 | 94.0 |
| 3 | 6.3 | 400 | 280 | 92.8 |
| 3 | 7.5 | 400 | 320 | 91.53 |
| 3[2] | 9.0 | 500 | 360 | |

[1] Average of 3 runs.
[2] After 1.5 minutes at these conditions, a stream was produced, but it stopped almost instantaneously.

Cores 1 and 2 were propped with 12–20 walnut shells, and core 3 was propped with 8–10 aluminum beads.

(II)

TUBE PACKED WITH GRAVEL

A tube was packed with gravel and squeezed with the slurry. After the slurry had gelled, 40 p.s.i. of water pressure was applied to the consolidation. No water was produced in five minutes at 40 p.s.i.

(III)

DIAGRAM OF TEST TO DETERMINE SAND SIEVE SIZES PENETRATED BY SLURRY

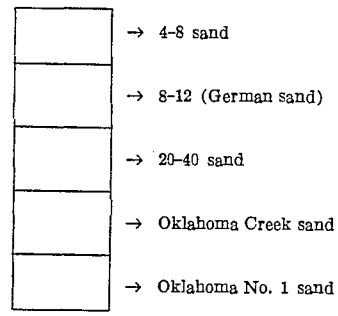

The formulation used was 100 cc. of the 10% acrylamide mixture and 0.1 cc. of the surfactant plus 50 g. of gilsonite.

Penetration of the slurry extended through the 4–8 sand into the 8–12 sand. The 4–8 sand was consolidated with the slurry, and all of the other sands were consolidated with the gelling material with the exception of the 8–12 German sand.

It is quite possible that the 8–12 German sand was pre-coated. If it were, that could explain why the gelling material would be set in it.

Similar laboratory results were obtained using the chrome lignin gel and finely divided gilsonite.

It can be appreciated, that the present invention, is not limited to any particular water soluble pre-polymer or gelling material, and that the particular gelling materials disclosed herein are by way of example only.

It can also be appreciated, that this invention is not limited to the use of any particular finely divided inert or non-reactive solids, and that the particular inert solids disclosed herein are by way of example only.

It should be understood that the terms soil stabilization or soil stabilizer are intended to include methods of and compositions for grouting, consolidating of loose sands, fluid shut off, or any injection or introduction of a plymerizable solution into an earth formation.

Broadly, the present invention relates to a method of stabilizing soils or grouting, utilizing a slurry of a water soluble pre-polymer gelling material and a specified quantity of finely divided solids of a particular size suspended in the slurry, and which may or may not include a surfactant, depending upon the necessity therefor to disperse and suspend the solid particles, and which gelling material is polymerized by a suitable catalyst which may be an integral part of the slurry or applied externally thereto.

The foregoing disclosure and description of the invention is illustrative and explanatory thereof and various changes may be made within the scope of the appended claims, without departing from the spirit of the invention.

What is claimed is:

1. A method of stabilizing earth formation which comprises injecting into the formation, an aqueous solution of a gelling material selected from the group consisting of water-soluble polymerizable materials and chrome lignin materials and finely divided inert solids selected from the group consisting of gilsonite, asphaltic pyrobitumens, silica flour, barite, bauxite, talc, scoria and calcium carbonate suspended therein, said solids being of a particle size of from about 10 microns to about 180 microns and being present in an amount of from about .25 absolute gallons to about 1.25 absolute gallons per gallon of solution.

2. The method of claim 1, wherein the water soluble gelling material of the polymerizable solution is an ethenoid monomer containing an acrylyl group.

3. A method of soil stabilization, including the step of injecting into the soil, an aqueous solution of a copolymerizable mixture comprising between about 0.005 and about 0.3 part of a monomeric alkylidene bisacrylamide of the formula:

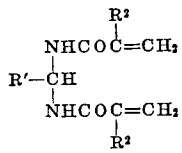

in which

is a hydrocarbon residue of an aldehyde and $R^2$ is selected from the group consisting of hydrogen and methyl, and another ethylenic comonomer of at least about 2 percent by weight solubility in water at 20 degrees centigrade, and a quantity of finely divided inert solids selected from the group consisting of gilsonite, asphaltic pyrobitumens, silica flour, barite, bauxite, talc, scoria and calcium carbonate dispersed and suspended therein, said solids having a particle size of about 10 microns to about 180 microns and being present in an amount of about .25 absolute gallon to about 1.25 absolute gallons per gallon of aqueous solution, and which composition is convertible by a copolymerization reaction in the presence of a catalyst to a substantially water insoluble mass.

4. The method of claim 3, wherein the alkylidene bisacrylamide is N,N'-methylene bisacrylamide.

5. The method of claim 1, wherein the finely divided solids are gilsonite and said solution includes a surfactant for enabling the gilsonite to be suspended therein.

6. A method of stabilizing soil, comprising the step of injecting into the soil, an aqueous solution of a copolymerizable mixture comprising an ethylenic monomer of the formula:

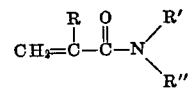

in which R is selected from the group consisting of hydrogen and methyl and R' and R" are selected from the group consisting of hydrogen and alkyl and a copolymerizable cross-linking material, a quantity of finely divided inert solids selected from the group consisting of gilsonite, asphaltic pyrobitumens, silica flour, barite, bauxite, talc, scoria and calcium carbonte dispersed and suspended therein said solids having a particle size of about 10 microns to about 180 microns and being present in an amount of about .25 absolute gallon to about 1.25 absolute gallons per gallon of solution, which solution is convertible by a copolymerization reaction in the presence of a catlyst to a substantially water insoluble mass.

7. The method of claim 6, wherein the cross-linking material is an alkylidene bisacrylamide of the formula:

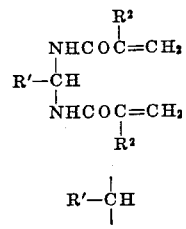

in which is a hydrocarbon residue of an aldehyde and $R^2$ is of the group consisting of hydrogen and methyl.

8. The method of claim 7, wherein said ethylenic monomer is present in the mixture in an amount of about 95–99% by weight, and said alkylidene bisacrylamide is present in the mixture in an amount of about 1–5% by weight.

9. A method of stabilizing soils, comprising the step of inpecting an aqueous solution of sodium silicate into the soil, said solution having suspended therein silica flour in an amount of about .25 absolute gallon to about 1.25 absolute gallons per gallon of solution and of a particle size of about 10 microns to about 180 microns per gallon of solution, and which solution is convertible in the presence of a catalyst to a substantially water insoluble mass.

10. A method of stabilizing soils, comprising the step of injecting an aqueous solution of a chrome lignin liquor into the soil, said solution having suspended therein silica flour in an amount of about .25 absolute gallon to about 1.25 absolute gallons per gallon of solution and of a particle size of about 10 microns to about 180 microns per gallon of solution, and which solution is convertible in the presence of a catalyst to a substantially water insoluble mass.

11. The method of claim 1, wherein the water soluble gelling material of the polymerizable solution is sodium silicate.

12. The method of claim 1, wherein the water soluble gelling material of the polymerizable solution is chrome lignin liquor.

13. The method of claim 1, wherein the finely divided solids are asphaltic pyrobitumens and said solution includes a surfactant for enabling the solids to be suspended therein.

14. The method of claim 3, wherein the finely divided solids are silica flour.

15. The method of claim 8, wherein the finely divided solids are silica flour.

16. The method of claim 1, wherein said finely divided inert solids are silica flour.

17. The method of claim 1, wherein said finely divided inert solids are barite.

18. The method of claim 1, wherein said finely divided inert solids are bauxite.

19. The method of claim 1, wherein said finely divided inert solids are talc.

20. The method of claim 1, wherein said finely divided inert solids are scoria.

21. The method of claim 1, wherein said finely divided inert solids are calcium carbonate.

References Cited by the Examiner
UNITED STATES PATENTS

| | | |
|---|---|---|
| 2,700,655 | 1/1955 | Endres et al. |
| 2,801,985 | 8/1957 | Roth. |
| 3,136,360 | 6/1964 | Ramos et al. _____ 166—12 |

WILLIAM H. SHORT, *Primary Examiner.*

JAMES A. SEIDLECK, *Examiner.*